US011273832B2

(12) United States Patent
Ide (10) Patent No.: US 11,273,832 B2
(45) Date of Patent: *Mar. 15, 2022

(54) DRIVING SUPPORT APPARATUS (71) Applicant: TOYOTA JIDOSHA KABUSHIKI KAISHA, Toyota (JP)

(72) Inventor: Hirohito Ide, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,302

(22) Filed: Jul. 22, 2020

(65) Prior Publication Data

US 2020/0346647 A1 Nov. 5, 2020

Related U.S. Application Data (63) Continuation of application No. 16/139,205, filed on Sep. 24, 2018, now Pat. No. 10,759,427.

(30) Foreign Application Priority Data

Sep. 28, 2017 (JP) .............................. JP2017-187488

(51) Int. Cl.
*B60W 30/165* (2020.01)
*B62D 15/02* (2006.01)
(Continued)

(52) U.S. Cl.
CPC ......... *B60W 30/165* (2013.01); *B62D 15/025* (2013.01); *B62D 15/026* (2013.01);
(Continued)

(58) Field of Classification Search
None
See application file for complete search history.

(56) References Cited

U.S. PATENT DOCUMENTS 9,884,585 B1   2/2018 Lubbers
10,345,815 B2 * 7/2019 Lv .................. G05D 1/0295
(Continued)

FOREIGN PATENT DOCUMENTS

JP   2006-315491 A   11/2006
JP   2008-195402 A   8/2008
(Continued)

*Primary Examiner* — Kaveh Abrishamkar
(74) *Attorney, Agent, or Firm* — Sughrue Mion, PLLC (57) ABSTRACT A driving support apparatus for an own vehicle includes a lane keeping assist control unit. When an interrupting vehicle enters ahead of the own vehicle in (i) a situation in which no preceding vehicle is present ahead of the own vehicle, or (ii) a situation in which a preceding vehicle is present ahead of the own vehicle, while a deviation angle formed between a direction of a traveling trajectory of the interrupting vehicle and a traveling direction of the own vehicle is larger than a threshold, the lane keeping assist control unit is configured not to perform a lane keeping assist control based on the traveling trajectory of the interrupting vehicle, and is configured to discard the traveling trajectory of the interrupting vehicle. On and after the deviation angle becomes equal to or smaller than the threshold, the lane keeping assist control unit is configured to perform the lane keeping assist control based on the traveling trajectory of the interrupting vehicle.

4 Claims, 6 Drawing Sheets (51) Int. Cl.
  *B60W 10/06* (2006.01)
  *B60W 10/184* (2012.01)
  *G05D 1/02* (2020.01)
  *B60W 40/04* (2006.01)

(52) U.S. Cl.
  CPC ... *B60T 2201/081* (2013.01); *B60T 2201/089* (2013.01); *B60W 10/06* (2013.01); *B60W 10/184* (2013.01); *B60W 40/04* (2013.01); *B60W 2420/42* (2013.01); *B60W 2420/52* (2013.01); *B60W 2554/4041* (2020.02); *G05D 1/0212* (2013.01)

(56) References Cited

U.S. PATENT DOCUMENTS

| | | | |
|---|---|---|---|
| 10,427,631 B1 | 10/2019 | Jimenez | |
| 10,759,427 B2* | 9/2020 | Ide | B60W 30/165 |
| 2005/0012602 A1 | 1/2005 | Knoop et al. | |
| 2005/0270145 A1 | 12/2005 | Kataoka et al. | |
| 2006/0025918 A1 | 2/2006 | Saeki | |
| 2008/0065328 A1 | 3/2008 | Eidehall | |
| 2008/0208408 A1 | 8/2008 | Arbitmann et al. | |
| 2010/0256869 A1 | 10/2010 | Lich et al. | |
| 2010/0324797 A1 | 12/2010 | Fritz | |
| 2011/0035106 A1 | 2/2011 | Hauler et al. | |
| 2012/0109465 A1 | 5/2012 | Svensson et al. | |
| 2013/0338877 A1 | 12/2013 | Strauss et al. | |
| 2014/0067252 A1 | 3/2014 | Knoop et al. | |
| 2014/0229068 A1* | 8/2014 | Ueyama | B62D 15/0255 701/41 |
| 2014/0257686 A1* | 9/2014 | Feldman | B60T 7/22 701/300 |
| 2015/0057907 A1* | 2/2015 | Rebhan | B60W 50/0097 701/93 |
| 2015/0088382 A1 | 3/2015 | Obuchi | |
| 2015/0274158 A1* | 10/2015 | Fujita | B62D 15/025 701/23 |
| 2015/0284026 A1* | 10/2015 | Muller | B62D 5/008 701/41 |
| 2015/0329108 A1* | 11/2015 | Kodaira | B60W 10/20 701/41 |
| 2015/0336607 A1* | 11/2015 | Inoue | B60W 40/114 701/41 |
| 2016/0200317 A1 | 7/2016 | Danzl et al. | |
| 2017/0326981 A1 | 11/2017 | Masui et al. | |
| 2018/0244275 A1* | 8/2018 | Bremkens | G05D 1/0276 |
| 2018/0362028 A1* | 12/2018 | Prokhorov | B60W 60/0011 |
| 2020/0079379 A1* | 3/2020 | Mimura | B60W 10/20 |
| 2021/0024069 A1* | 1/2021 | Herman | G06N 3/084 |

FOREIGN PATENT DOCUMENTS

| | | |
|---|---|---|
| JP | 4172434 B2 | 10/2008 |
| JP | 2009-190464 A | 8/2009 |
| JP | 4349210 B2 | 10/2009 |
| JP | 2010-6279 A | 1/2010 |
| JP | 2011-514580 A | 5/2011 |
| JP | 4929777 B2 | 5/2012 |
| JP | 2014-148293 A | 8/2014 |
| JP | 2014194194 A | 10/2014 |
| JP | 2015027837 A | 2/2015 |
| JP | 2015058920 A | 3/2015 |

\* cited by examiner

$$\text{RADIUS OF CURVATURE } R(x) = \frac{(1 + 3ax^2 + 2bx + c)^{1.5}}{6ax + 2b}$$

$$\text{CURVATURE } Cv(x) = \frac{6ax + 2b}{(1 + 3ax^2 + 2bx + c)^{1.5}}$$

$1 >> 3ax^2 + 2bx + c$ $\tan \theta v \fallingdotseq \theta v$

FIG.3C $Cv(x) = 6ax + 2b$
$Cv(0)(=Cv) = 2b$
$C(x')(=Cv') = 6a$
$\theta v = c$
$dv = d$

DRIVING SUPPORT APPARATUS

CROSS REFERENCE TO RELATED APPLICATION

This application is a continuation of U.S. application Ser. No. 16/139,205 filed Sep. 24, 2018 (allowed), which claims priority from Japanese Patent Application No. 2017-187488 filed Sep. 28, 2017. The entire disclosures of the prior applications are considered part of the disclosure of the accompanying continuation application, and are hereby incorporated herein by reference in their entirety.

BACKGROUND

1. Technical Field

The present disclosure relates to a driving support apparatus configured to perform a lane keeping assist control for assisting traveling of a vehicle (own vehicle) in the vicinity of a center position of a lane by using a traveling trajectory of a preceding vehicle.

2. Description of the Related Art

One of driving support apparatuses that are conventionally known is configured to perform a lane keeping assist control for performing a steering control in such a manner that an own vehicle travels in a travel lane.

For example, an apparatus (hereinafter, referred to as a "related-art apparatus") as disclosed in Japanese Unexamined Patent Application Publication (Translation of PCT Application) No. 2011-514580 specifies, when performing the lane keeping assist control, a preceding vehicle traveling ahead of the own vehicle. The related-art apparatus performs the steering control in such a manner that the own vehicle travels along a traveling trajectory (hereinafter, referred to as a "preceding vehicle trajectory") of the specified preceding vehicle.

However, when performing the lane keeping assist control by utilizing the preceding vehicle trajectory, the following problem may occur. For example, when a situation occurs in which an other vehicle enters ahead of the own vehicle, the related-art apparatus specifies the "other vehicle (also referred to as an "interrupting (or cutting-in) vehicle" for convenience)" as a new preceding vehicle. Then, the related-art apparatus performs the steering control in such a manner that the traveling position of the own vehicle is maintained near a preceding vehicle trajectory of the interrupting vehicle (i.e., the new preceding vehicle). At this time, since "a relatively-rapid traveling behavior in a road-width direction of the interrupting vehicle" affects (or is reflected on) the preceding vehicle trajectory, the traveling position of the own vehicle suddenly moves in the road-width direction. Therefore, when the interrupting vehicle enters ahead of the own vehicle, there is a problem that the own vehicle cannot travel stably along the travel lane. In the present specification, the other vehicle (that is, the following first other vehicle) entering ahead of (in front of) the own vehicle is referred to as the "interrupting vehicle" in both of the following cases (i) and (ii): (i) the first other vehicle enters between the own vehicle and a second other vehicle traveling ahead of the own vehicle; and (ii) the first other vehicle enters ahead of the own vehicle in a situation in which no second other vehicle is present ahead of the own vehicle.

SUMMARY

One or more embodiments have been devised in view of the above-mentioned problem. Specifically, there is provided a driving support apparatus configured to, when an interrupting vehicle enters ahead of the own vehicle, start at an appropriate timing the lane keeping assist control based on the preceding vehicle trajectory of the interrupting vehicle to thereby have the own vehicle travel along the travel lane stably.

According to one embodiment, there is provided a driving support apparatus for an own vehicle, including:

a preceding vehicle trajectory obtaining unit (10, 10b, 16) configured to obtain a traveling trajectory of an other vehicle which travels ahead of the own vehicle; and a lane keeping assist control unit (10, 10d, 40) configured to perform a lane keeping assist control for changing a steering angle of the own vehicle in such a manner that the own vehicle travels along a target traveling line set based on the traveling trajectory.

Further, when a specific state/situation occurs in which an interrupting/cutting-in vehicle is entering ahead of the own vehicle in (i) a situation in which no preceding vehicle is present ahead of the own vehicle, or (ii) a situation in which a preceding vehicle is present ahead of the own vehicle, the preceding vehicle trajectory obtaining unit is configured to obtain the traveling trajectory of the interrupting vehicle (Step 730).

In addition, when the specific state/situation occurs, while a deviation angle (θv) formed between a direction of the traveling trajectory of the interrupting vehicle and a traveling direction of the own vehicle is larger than a predetermined threshold (Th1), the lane keeping assist control unit is configured not to perform the lane keeping assist control based on the traveling trajectory of the interrupting vehicle, and is configured to have the preceding vehicle trajectory obtaining unit discard the traveling trajectory of the interrupting vehicle ("No" determination at Step 745, and Step 750).

Further, on and after the deviation angle becomes/is equal to or smaller than the predetermined threshold, the lane keeping assist control unit is configured to perform the lane keeping assist control based on the traveling trajectory of the interrupting vehicle obtained by the preceding vehicle trajectory obtaining unit ("Yes" determination at Step 745, Step 755, Step 760 and Step 765; "No" determination at Step 740, Step 760 and Step 765).

The above driving support apparatus is configured not to perform, when the interrupting vehicle is entering ahead of the own vehicle, the lane keeping assist control based on the traveling trajectory of the interrupting vehicle for a temporary period of time.

The deviation angle (θv) becomes larger than the predetermined threshold (Th1) until a certain period of time elapses from a time point at which the interrupting vehicle starts to enter ahead of the own vehicle. Therefore, in this period, the driving support apparatus discards the traveling trajectory of the interrupting vehicle and does not perform the lane keeping assist control based on the traveling trajectory of the interrupting vehicle. Accordingly, even when the interrupting vehicle enters ahead of the own vehicle, the own vehicle can be made to travel stably along the travel lane without suddenly moving in the road-width direction.

After the interruption action/movement of the interrupting vehicle has substantially been completed, the above deviation angle becomes equal to or smaller than the predetermined threshold. Therefore, on and after the deviation angle becomes/is equal to or smaller than the predetermined threshold, the driving support apparatus performs the lane keeping assist control based on the traveling trajectory of the interrupting vehicle. Since the traveling trajectory of the interrupting vehicle has been discarded until the completion of the interruption action of the interrupting vehicle, the "relatively-rapid traveling behavior in the road-width direction of the interrupting vehicle" is not reflected on the traveling trajectory. Accordingly, the own vehicle can be made to travel along the travel lane stably.

In another aspect (e.g., Modification 1, and Modification 2, as described later) of the driving support apparatus, when the specific state/situation occurs in a situation in which a preceding vehicle is present ahead of the own vehicle and the lane keeping assist control unit is performing the lane keeping assist control based on the traveling trajectory of the preceding vehicle, the lane keeping assist control unit is configured to continue performing the lane keeping assist control based on the traveling trajectory of the preceding vehicle while the deviation angle is larger than the predetermined threshold ("No" determination at Step 745, and Step 750).

Further, on and after the deviation angle becomes/is equal to or smaller than the predetermined threshold, the lane keeping assist control unit is configured to perform the lane keeping assist control based on the traveling trajectory of the interrupting vehicle ("Yes" determination at Step 745, Step 755, Step 760 and Step 765; "No" determination at Step 740, Step 760 and Step 765).

In the present aspect, when the interrupting vehicle enters ahead of the own vehicle in the situation in which the preceding vehicle is present ahead of the own vehicle and the lane keeping assist control unit is performing the lane keeping assist control based on the traveling trajectory of that preceding vehicle, the lane keeping assist control unit continues performing the lane keeping assist control based on the traveling trajectory of the preceding vehicle while (as long as) the deviation angle ($\theta v$) is larger than the predetermined threshold (Th1). In the present aspect, on and after the interruption action of the interrupting vehicle has substantially been completed, the lane keeping assist control unit performs the lane keeping assist control based on the traveling trajectory of the interrupting vehicle. Therefore, even in the case where the interrupting vehicle enters ahead of the own vehicle while the lane keeping assist control is being performed based on the traveling trajectory of the preceding vehicle, the own vehicle can be made to travel stably along the travel lane without suddenly moving in the road-width direction.

In the above description, in order to facilitate understanding of the above one or more aspect of the embodiment, a name and/or reference numeral used in embodiments described below is enclosed in parentheses and assigned to each of the constituent features corresponding to the embodiments. However, each of the constituent features is not limited to the embodiments defined by the name and/or reference numeral.

BRIEF DESCRIPTION OF THE DRAWINGS

FIG. 3B shows expressions for explaining a relationship between coefficients of a cubic function of the preceding vehicle trajectory, a curvature of the cubic function, a radius of curvature of the cubic function, and the like.

FIG. 3C shows expressions for explaining a relationship between the coefficients of the cubic function of the preceding vehicle trajectory, the curvature of the cubic function, a yaw angle, and the like.

DETAILED DESCRIPTION OF THE EMBODIMENTS

Now, referring to the accompanying drawings, a description is given of embodiments. The accompanying drawings are illustrations of one or more specific embodiments in conformity with the principle thereof, but those illustrations are examples to be used for the understanding of the embodiment(s), and are not to be used to limit the interpretation of the present disclosure.

Figure 1:
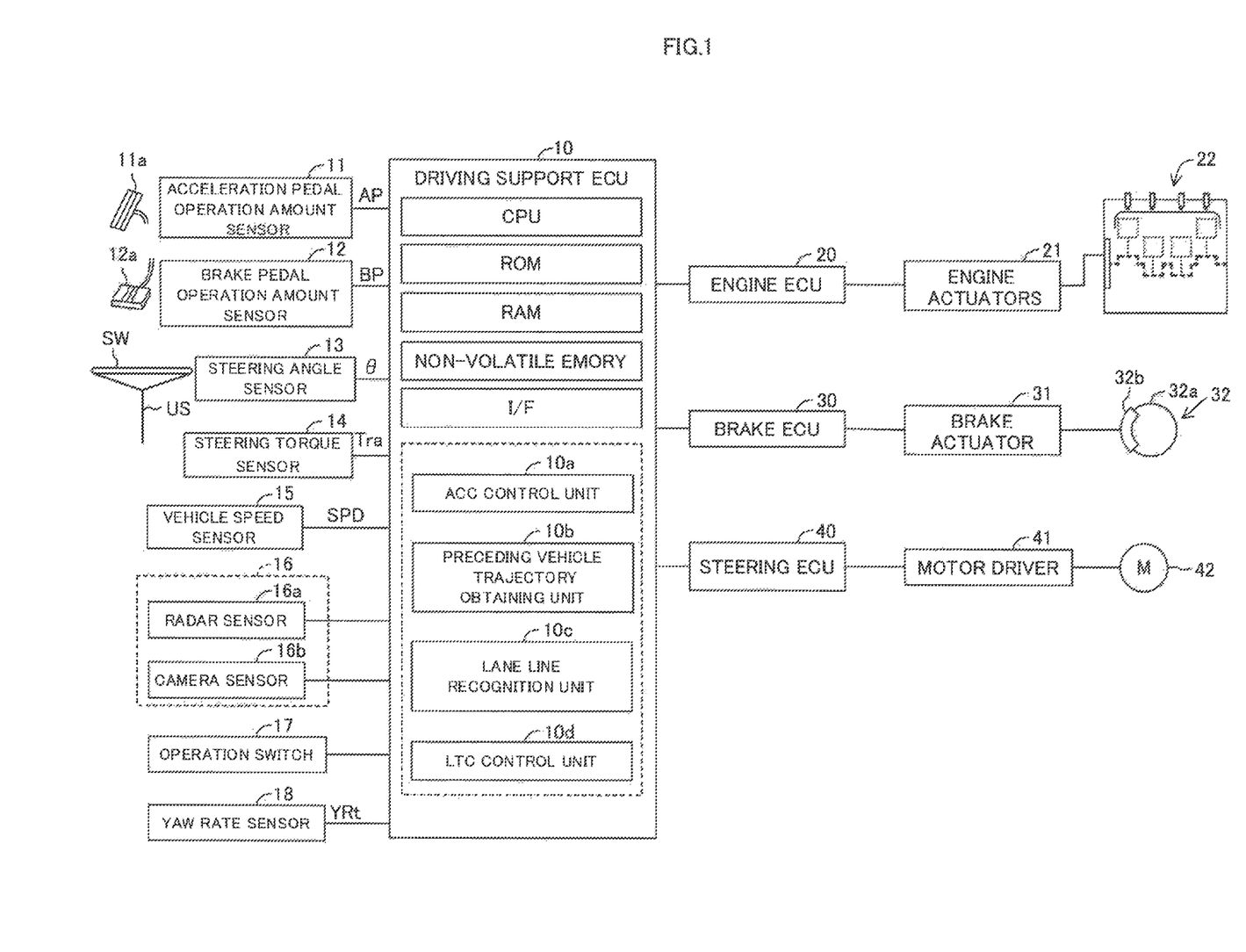
FIG. 1 is a schematic configuration diagram for illustrating a driving support apparatus for a vehicle according to an embodiment.

As illustrated in FIG. 1, a driving support apparatus (hereinafter, referred to as an "embodiment apparatus") according to an embodiment is applied to a vehicle. A vehicle to which the embodiment apparatus is applied may be referred to as an "own vehicle" in order to be distinguished from other vehicles. The embodiment apparatus includes a driving support (assist) ECU 10, an engine ECU 20, a brake ECU 30, and a steering ECU 40.

Those ECUs are electric control units each including a microcomputer as a main part, and are connected to one another so as to be able to mutually transmit and receive information via a controller area network (CAN) (not shown). The microcomputer herein includes a CPU, a ROM, a RAM, a non-volatile memory, an interface I/F, and the like. The CPU executes instructions (programs and routines) stored in the ROM to realize various functions.

The driving support ECU 10 is electrically connected to sensors including switches described later and receives detection signals or output signals of the sensors, respectively. The sensors may be electrically connected to any of the ECUs other than the driving support ECU 10. In this case, the driving support ECU 10 receives the detection signals or the output signals of the sensors from the ECUs electrically connected to the sensors via the CAN.

An acceleration pedal operation amount sensor 11 detects an operation amount (accelerator opening) AP of an acceleration pedal 11a of the own vehicle and outputs a detection signal or an output signal representing the operation amount AP to the driving support ECU 10.

A brake pedal operation amount sensor 12 detects an operation amount BP of a brake pedal 12a of the own vehicle and outputs a detection signal or an output signal representing the operation amount BP to the driving support ECU 10.

A steering angle sensor 13 detects a steering angle θ of the own vehicle and outputs a detection signal or an output signal indicative of the steering angle θ to the driving support ECU 10.

A steering torque sensor 14 detects a steering torque Tra applied to a steering shaft US of the own vehicle by an operation of a steering wheel SW and outputs a detection signal or an output signal indicative of the steering torque Tra to the driving support ECU 10.

A vehicle speed sensor 15 detects a traveling speed SPD of the own vehicle and outputs a detection signal or an output signal indicative of the traveling speed SPD to the driving support ECU 10.

An ambient sensor 16 acquires at least information on a road ahead of the own vehicle and information on three-dimensional objects being present on the road. The three-dimensional objects include, for example, moving objects such as pedestrians, bicycles, vehicles and the like, and motionless objects such as power poles, trees, guardrails and the like. Hereinafter, the three-dimensional object will be referred to as a "target object". The ambient sensor 16 includes a radar sensor 16a and a camera sensor 16b.

The radar sensor 16a transmits radio waves each having a millimeter wave band to an area surrounding the own vehicle including at least an area in front of the own vehicle, and receives radio waves reflected by the target object(s) being present within a radiation range. Hereinafter, the radio wave having the millimeter wave band will be referred to as a "millimeter wave" and the radio wave reflected by the target object will be referred to as a "reflected wave". The radar sensor 16a determines the presence or absence of the target object, calculates parameters representing a relative relationship between the own vehicle and the target object, and outputs the determination results and the calculation results to the driving support ECU 10. The parameters representing the relative relationship between the own vehicle and the target object include a distance between the own vehicle and the target object, a relative speed of the target object with respect to the own vehicle, and the like.

Specifically, the radar sensor 16a includes a millimeter wave transmitting/receiving part (not shown) and a signal processing part (not shown). The signal processing part acquires, every time a certain period of time elapses, the parameters representing the relative relationship between the own vehicle and the target object based on a phase difference between the millimeter wave transmitted from the millimeter wave transmitting/receiving part and the reflected wave received by the millimeter wave transmitting/receiving part, a damping level of the received reflected wave with respect to the transmitted millimeter wave, a time from the transmission of the millimeter wave to the reception of the reflected wave and the like. The parameters include an inter-vehicle distance (i.e. a longitudinal distance) Dfx(n) of the detected target object(n), a relative vehicle speed Vfx(n) of the target object (n), a lateral distance Dfy(n) of the target object (n), a relative lateral speed Vfy(n) of the target object (n) and the like.

The inter-vehicle distance Dfx(n) is a distance between the own vehicle and the target object (n) (e.g., a preceding vehicle) along a central axis of the own vehicle (central axis extending in the front-rear direction of the own vehicle, that is, the x-axis described later).

The relative vehicle speed Vfx(n) is a difference between a speed Vs of the target object (n) (preceding vehicle) and a speed Vj of the own vehicle (that is, Vfx(n)=Vs−Vj). The speed Vs of the target object (n) is a speed of the target object (n) in the traveling direction of the own vehicle (that is, the x-axis described later).

The lateral distance Dfy(n) is a distance in a direction (that is, the y-axis described later) perpendicular to the central axis of the own vehicle between a central position of the target object (n) (e.g., a central position in the vehicle-width direction of the preceding vehicle) and the central axis of the own vehicle. Hereinafter, the lateral distance Dfy(n) will be referred to as a "lateral position".

The relative lateral speed Vfy(n) is a speed of the central position of the target object (n) (e.g., central position in the vehicle-width direction of the preceding vehicle) in the direction (that is, the y-axis described later) perpendicular to the central axis of the own vehicle.

The camera sensor 16b includes a stereo camera (now shown) and an image processing part (not shown). The stereo camera takes a pair of right and left images of landscapes at a right side of the own vehicle ahead of (in front of) the own vehicle and at a left side of the own vehicle ahead of (in front of) the own vehicle. Based on the pair of right and left images, the image processing part determines the presence or absence of the target object, calculates the parameters representing the relative relationship between the own vehicle and the target object, and outputs the determination results and the calculation results to the driving support ECU 10. In this configuration, the driving support ECU 10 obtains/determines/defines the parameters representing the relative relationship between the own vehicle and the target object by synthesizing the following (i) and (ii):

(i) the parameters acquired by the radar sensor 16a, which represent the relative relationship between the own vehicle and the target object, and (ii) the parameters acquired by the camera sensor 16b, which represent the relative relationship between the own vehicle and the target object.

The camera sensor 16b recognizes right and left lane lines of the road (that is, a lane in which the own vehicle is traveling) based on the pair of right and left images. The camera sensor 16b calculates a shape of the road and a positional relationship between the road and the own vehicle (e.g., a distance between the central position in the vehicle-width direction of the own vehicle and a left or right edge of the lane), and outputs the calculation results to the driving support ECU 10. The lane line includes a white line, a yellow line and the like. Hereinafter, an example where the lane line is the white line will be described.

Information on the target object which is acquired by the ambient sensor 16 will be referred to as "target object information". The information includes the parameters representing the relative relationship between the own vehicle and the target object. The ambient sensor 16 repeatedly transmits the target object information to the driving support ECU 10 every time a certain sampling period of time elapses. The ambient sensor 16 does not necessarily include both the radar sensor and the camera, but may include only one of the radar sensor and the camera.

An operation switch 17 is a switch which is operated by a driver of the own vehicle. The driver can control whether or not to perform a lane keeping assist control described later by operating the operation switch 17. Further, the driver can control whether or not to perform a following-travel inter-vehicle-distance control such as an adaptive cruise control (ACC) described later by operating the operation switch 17.

A yaw rate sensor 18 detects a yaw rate YRt of the own vehicle and outputs a detection signal or output signal indicative of the yaw rate YRt to the driving support ECU 10.

The engine ECU 20 is electrically connected to engine actuators 21 of the engine 22. The engine actuators 21 include at least a throttle valve actuator (not shown) for changing an opening degree of the throttle valve of the engine 22. The engine ECU 20 can change an engine torque generated by the engine 22 by controlling activations of the engine actuators 21. The engine torque generated by the engine 22 is transmitted to drive wheels (not shown) through a transmission (not shown). Therefore, the engine ECU 20 can control a driving force supplied to the own vehicle (that is, to the drive wheels) by controlling the activations of the engine actuators 21 to thereby change an acceleration or an acceleration state. In a case where the own vehicle is a hybrid vehicle, the engine ECU 20 can control the driving force generated by one or both of "the engine and an electric motor" as the vehicle driving source. In a case where the own vehicle is an electric vehicle (battery vehicle), the engine ECU 20 can control the driving force generated by the electric motor as the vehicle driving source.

The brake ECU 30 is electrically connected to a brake actuator 31. The brake actuator 31 is provided in a hydraulic circuit provided between a master cylinder (not shown) for pressurizing hydraulic oil by a depression force of the brake pedal 12a and a friction brake mechanism 32 provided in right and left front and rear wheels of the own vehicle. The brake actuator 31 adjusts a hydraulic pressure supplied to a wheel cylinder (not shown) in each brake caliper 32b of the friction brake mechanism 32, depending on a command sent from the brake ECU 30. The wheel cylinder is activated by the hydraulic pressure to press a brake pad (not shown) on the brake disc 32a, thereby to generate a friction braking force on the brake disc 32a. Therefore, the brake ECU 30 can control an activation of the brake actuator 31 to control the braking force applied to the own vehicle (that is, to the wheels) to thereby change an acceleration or an acceleration state (or deceleration, that is, negative acceleration).

The steering ECU 40 is a control device of a known electric powered steering system and is electrically connected to a motor driver 41. The motor driver 41 is electrically connected to a steering motor 42. The steering motor 42 is assembled in a steering mechanism (not shown) including the steering wheel SW, the steering shaft US connected to the steering wheel SW, a steering gear mechanism (not shown) and the like. The steering motor 42 generates a torque by an electric power supplied from the motor driver 41 and uses the torque to apply a steering assist torque to the steering shaft US to thereby steer the right and left steered wheels. That is, the steering motor 42 can change a steering angle of the own vehicle.

Next, an outline of control performed by the embodiment apparatus will be described. The driving support ECU 10 is capable of performing the "adaptive cruise control (ACC)" and the "lane keeping assist control".

<Adaptive Cruise Control (ACC)>

When a preceding vehicle (referred to as an "ACC-target vehicle") traveling immediately ahead of the own vehicle is present, the following-travel inter-vehicle-distance control has the own vehicle follow the preceding vehicle while maintaining an inter-vehicle distance between the preceding vehicle and the own vehicle at a predetermined distance, based on the target object information. In the following, the following-travel inter-vehicle-distance control is referred to as "Adaptive Cruise Control (ACC)". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description on the ACC is now given.

The driving support ECU 10 is configured to perform the ACC when the ACC is requested through the operation applied to the operation switch 17.

Specifically, the driving support ECU 10 selects the ACC-target vehicle, which the own vehicle should follow, based on the target object information acquired by the ambient sensor 16 when the ACC is requested. For example, the driving support ECU 10 determines whether or not a relative position of the target object (n) is present within a following-target vehicle area. The relative position of the target object (n) is determined based on the lateral distance Dfy(n) and the inter-vehicle distance Dfx(n) of the detected target object (n). The following-target vehicle area is an area previously determined such that, the longer the distance in the traveling direction of the own vehicle estimated based on the vehicle speed of the own vehicle and the yaw rate of the own vehicle becomes, the smaller the absolute value of the distance in the lateral direction with respect to the traveling direction becomes. Then, when the relative position of the target object (n) is present within the following-target vehicle area for a time equal to or longer than a predetermined time, the driving support ECU 10 selects the target object (n) as the ACC-target vehicle. If a plurality of target objects (n) are present whose relative positions are present within the following-target vehicle area for the time equal to or longer than the predetermined time, the driving support ECU 10 selects as the ACC-target vehicle the target object having the minimum inter-vehicle distance Dfx(n) from among those target objects.

Further, the driving support ECU 10 calculates a target acceleration Gtgt in accordance with any of the following Expressions (1) and (2). In the Expressions (1) and (2), Vfx(a) is a relative vehicle speed of the ACC-target vehicle (a) with respect to the own vehicle, k1 and k2 are predetermined positive gains or coefficients, and ΔD1 is an inter-vehicle distance difference obtained by subtracting a target inter-vehicle distance Dtgt from the inter-vehicle distance Dfx(a) of the ACC-target vehicle (a) (ΔD1=Dfx(a)−Dtgt). The target inter-vehicle distance Dtgt is calculated by multiplying a target inter-vehicle time Ttgt by the vehicle speed SPD of the own vehicle 100 (Dtgt=Ttgt×SPD). The target inter-vehicle time Ttgt is set by the driver using the operation switch 17.

The driving support ECU 10 determines the target acceleration Gtgt in accordance with the following Expression (1) when the value (k1×ΔD1+k2×Vfx(a)) is positive or zero. In the Expression (1), ka1 is a positive gain or coefficient for accelerating the own vehicle and is set to a value equal to or smaller than "1".

$$Gtgt \text{ (for acceleration)}=ka1 \times (k1 \times \Delta D1+k2 \times Vfx(a)) \quad (1)$$

On the other hand, when the value (k1×ΔD1+k2×Vfx(a)) is negative, the driving support ECU 10 determines the target acceleration Gtgt in accordance with the following Expression (2). In the Expression (2), kd1 is a gain or coefficient for decelerating the own vehicle and in this embodiment, is set to "1".

$$Gtgt \text{ (for deceleration)}=kd1 \times (k1 \times \Delta D1+k2 \times Vfx(a)) \quad (2)$$

When no target object is present within the following-target vehicle area, the driving support ECU 10 determines the target acceleration Gtgt based on the vehicle speed SPD of the own vehicle and a target vehicle speed in such a manner that the vehicle speed SPD of the own vehicle matches up with (becomes equal to) the target vehicle speed which is set depending on the target inter-vehicle time Ttgt.

The driving support ECU 10 controls the engine actuators 21 by using the engine ECU 20 and if necessary, and controls the brake actuator 31 by using the brake ECU 30 in such a manner that the acceleration of the own vehicle matches up with (becomes equal to) the target acceleration Gtgt. As described above, the driving support ECU 10 has, as a functional unit implemented by the CPU, a "ACC control unit 10a for performing the following-travel inter-vehicle-distance control such as the ACC".

<Lane Keeping Assist Control>

The driving support ECU 10 is configured to perform the lane keeping assist control when the lane keeping assist control is requested through the operation applied to the operation switch 17 while the following-travel inter-vehicle-distance control (ACC) is being performed.

In the lane keeping assist control, the driving support ECU 10 determines/sets/produces a target traveling line (target traveling path) by using one or both of a trajectory/locus of the preceding vehicle and the white lines. The target traveling line is set within the lane in which the own vehicle is currently traveling. Hereinafter, the trajectory/locus of the preceding vehicle is referred to as a "preceding vehicle trajectory". The driving support ECU 10 applies the steering torque to the steering system to change the steering angle of the own vehicle in such a manner that a lateral position (i.e., a position in the vehicle-width direction of the own vehicle with respect to the lane) of the own vehicle is maintained in an immediate vicinity of (at a position close to) the target traveling line. In this manner, the steering operation of the driver can be assisted/supported. The lane keeping assist control is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210). The lane keeping assist control is also referred to as "Lane Trace Control (LTC)" or "Traffic Jam Assist (TJA)". Hereinafter, the lane keeping assist control is sometimes simply referred to as "LTC".

Figure 2:
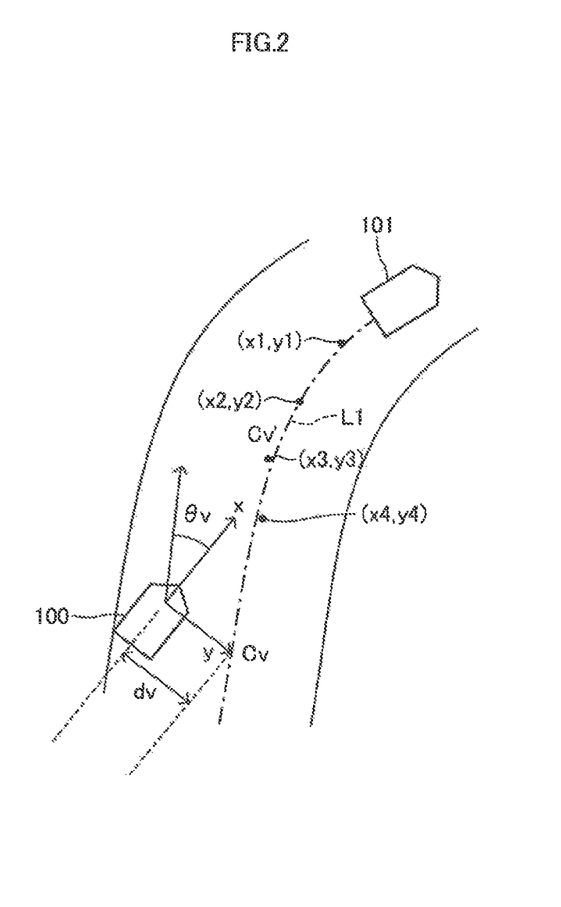
FIG. 2 is a plan view for illustrating a situation in which the lane keeping assist control is performed by using a target traveling line determined based on a preceding vehicle trajectory.

Next, an aspect of the LTC will be described in more detail. The LTC is performed by using the target traveling line determined based on the preceding vehicle trajectory. As illustrated in FIG. 2, the driving support ECU 10 specifies/determines a preceding vehicle 101 which is the target object for obtaining/calculating a preceding vehicle trajectory L1. The driving support ECU 10 obtains/calculates the preceding vehicle trajectory L1 based on the target object information. The target object information includes information on positions of the preceding vehicle 101 with respect to the position of the own vehicle 100 at predetermined time intervals. In the x-y coordinate shown in FIG. 2, the center axis extending in the front-rear direction of the own vehicle 100 is defined as the x-axis, the axis perpendicular to the x-axis is defined as the y-axis, and the current position of the own vehicle 100 is defined as the origin (x=0, y=0), respectively.

The symbols shown in FIG. 2 are as follows.

dv: a distance in the y-axis direction (substantially in the road-width direction) between the current position (x=0, y=0) of the center position in the vehicle-width direction of the own vehicle 100, and the preceding vehicle trajectory L1.

θv: an angle of deviation (yaw angle) between the direction (tangential direction) of the preceding vehicle trajectory L1 at a position corresponding to the current position (x=0, y=0) of the own vehicle 100, and the traveling direction ("+" direction of the x-axis) of the own vehicle 100. Hereinafter, the angle of deviation θv is also referred to as a "first deviation angle".

Cv: a curvature of the preceding vehicle trajectory L1 at a position (x=0, y=dv) corresponding to the current position (x=0, y=0) of the own vehicle 100.

Cv': a change ratio of the curvature, that is, a curvature change amount per unit distance (Δx) at an any position (x=x0, x0 is an arbitrary value) of the preceding vehicle trajectory L1.

For example, the driving support ECU 10 stores (buffers) position coordinate data (position information) on the position of the preceding vehicle 101 in the RAM every time the certain sampling period of time elapses. In order to minimize data to be stored in the RAM, the driving support ECU 10 may store only a limited number of "relatively new position coordinate data sets of the preceding vehicle 110" which have been obtained within a certain period up to the current time point and which includes the latest position coordinate data set, and discard the position coordinate data sets older than the data sets obtained in that certain period. The driving support ECU 10 converts the position coordinate data of the preceding vehicle 101 stored in the RAM into the position coordinate data of the above-described x-y coordinate system where the current position of the own vehicle 100 is the origin (x=0, y=0). The driving support ECU 10 executes the above-mentioned converting process based on the differences between (i) the position and traveling direction of the own vehicle 100 at each time point at which the position coordinate data is acquired, and (ii) the position and traveling direction of the own vehicle 100 at the current time point. In FIG. 2, (x1, y1), (x2, y2), (x3, y3) and (x4, y4) are examples of the position coordinate data of the preceding vehicle 101 which are obtained by converting in the above-mentioned manner. Hereinafter, such position coordinate data are also referred to as "converted position coordinate data".

The driving support ECU 10 executes a curve fitting process by using the converted position coordinate data of the preceding vehicle 101 to obtain the preceding vehicle trajectory L1 of the preceding vehicle 101. For example, a cubic function f(x) is used in the fitting curve process. In the fitting process, for example, the least squares method is used. As described above, the driving support ECU 10 has, as a functional unit implemented by the CPU, a "preceding vehicle trajectory obtaining unit 10b for obtaining/extrapolating/determining the preceding vehicle trajectory L1 of the preceding vehicle".

Figure 3A:
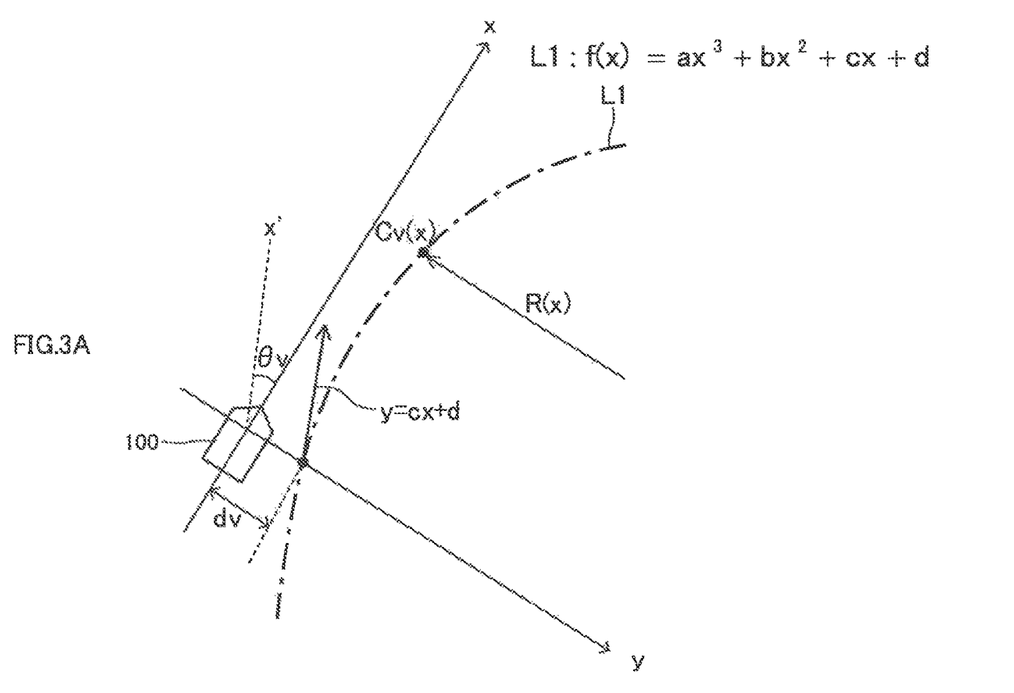
FIG. 3A is a plan view for explaining the lane keeping assist control of FIG. 2 in more detail.
Figure 3B:
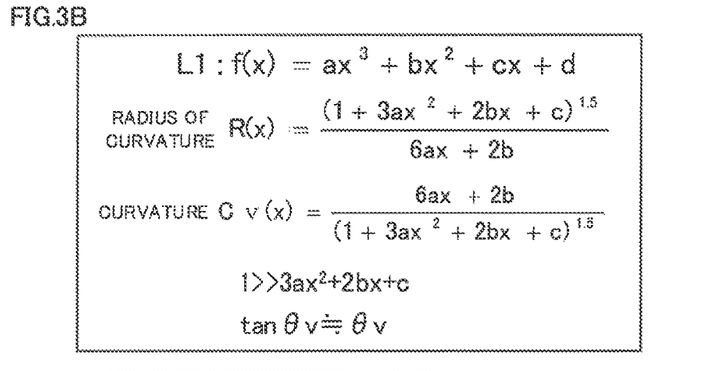

A method for obtaining the preceding vehicle trajectory L1 will be specifically described below. As illustrated in FIG. 3A, the preceding vehicle trajectory L1 is defined by the following cubic function: $f(x)=ax^3+bx^2+cx+d$. Using expressions and conditions shown in FIG. 3B, the relationship shown in FIG. 3C, that is, the relationship between the coefficients (a, b, c and d) of the cubic function f(x), the curvature Cv, the yaw angle θv and the like is derived. Therefore, the preceding vehicle trajectory L1 can be expressed by the following Equation (3). As described above, the driving support ECU 10 can determine/define the preceding vehicle trajectory L1 by obtaining the coefficients a, b, c and d of the cubic function f(x) by using the least squares method. Therefore, the change ratio of the curvature Cv' of the preceding vehicle trajectory L1, the curvature Cv of the preceding vehicle trajectory L1 at the position corresponding to the current position of the own vehicle 100, the yaw angle θv at that position, and the distance dv at that position can be obtained.

$$f(x)=(1/6)Cv'\times x^3+(1/2)Cv\times x^2+\theta v\times x+dv \quad (3)$$

Figure 3C:
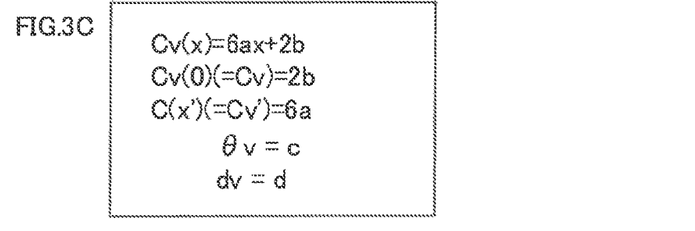

When setting the preceding vehicle trajectory L1 as the target traveling line, the driving support ECU 10 acquires the target lane information necessary for performing the LTC, based on the coefficients a, b, c and d of the cubic function f(x) and the relationship shown in FIG. 3C. The target lane information includes the curvature Cv (and the change ratio of the curvature Cv') of the target traveling line, the yaw angle θv of the own vehicle with respect to the target traveling line, and the distance dv in the road-width direction with respect to the target traveling line.

The driving support ECU 10 calculates, every time a certain period of time elapses, a target steering angle θ* by applying the curvature Cv, the yaw angle θv and the distance dv to the following Expression (4). Further, the driving support ECU 10 controls the steering motor 42 by using the steering ECU 40 in such a manner that an actual steering angle θ of the own vehicle matches up with (becomes equal to) the target steering angle θ*. In the Expression (4), Klta1, Klta2 and Klta3 are predetermined control gains or coefficients.

$$\theta^*=Klta1\times Cv+Klta2\times \theta v+Klra3\times dv \quad (4)$$

The driving support ECU 10 may calculate a target yaw rate YRc* in accordance with the following Expression (4'). The target yaw rate YRc* is a yaw rate necessary for having the own vehicle 100 travel along the target traveling line. The driving support ECU 10 may calculate a target steering torque Tr* for realizing/generating the target yaw rate YRc* by using a lookup table, the target yaw rate YRc* and an actual yaw rate YRt of the own vehicle. In this configuration, the driving support ECU 10 controls the steering motor 42 by using the steering ECU 40 in such a manner that the actual steering torque Tra of the own vehicle matches up with (becomes equal to) the target steering torque Tr*. In the Expression (4'), K1, K2 and K3 are predetermined control gains or coefficients.

$$YRc^*=K1\times dv+K2\times \theta v+K3\times Cv \quad (4')$$

The above is the outline of the lane keeping assist control using the target traveling line determined based on the preceding vehicle trajectory.

Figure 4:
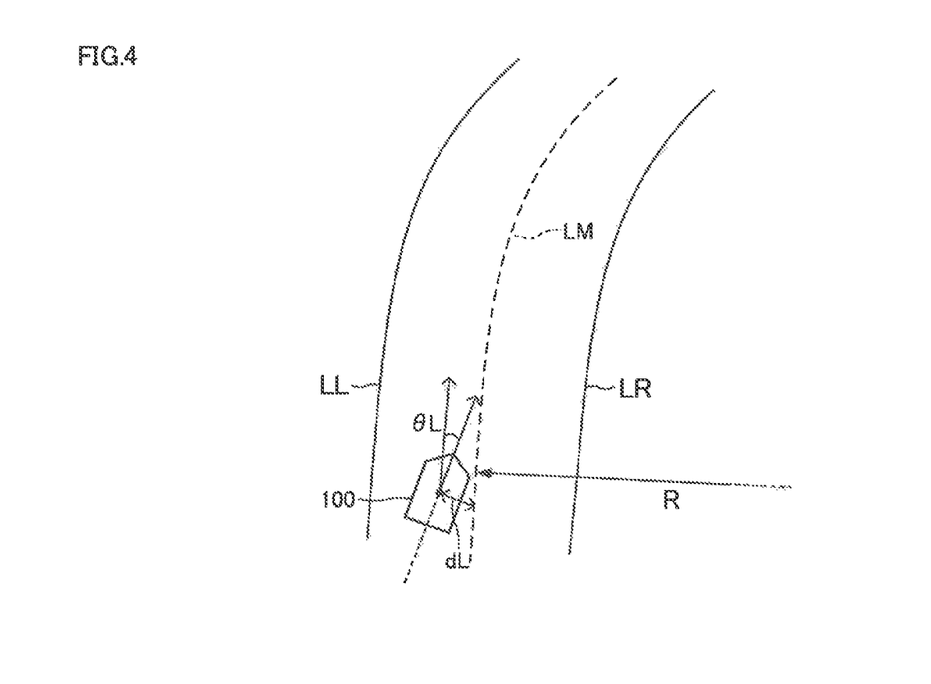
FIG. 4 is a plan view for illustrating a situation in which the lane keeping assist control is performed by using a target traveling line determined based on a center line of a travel lane.

Next, an aspect of the LTC will be described which is performed by using the target traveling line determined based on the white lines. As illustrated in FIG. 4, the driving support ECU 10 acquires information on a left white line LL and a right white line LR of a travel lane in which the own vehicle 100 is currently traveling, based on the information transmitted from the ambient sensor 16 (i.e., the information which has been recognized by the camera sensor 16b). The driving support ECU 10 extrapolates a line connecting center positions in the road-width direction between the recognized pair of the white lines LL and LR, and determines/defines the extrapolated line as a "center line LM of the travel lane". As described above, the driving support ECU 10 has, as a functional unit implemented by the CPU, a "lane line recognition unit 10c for extrapolating/determining the center line LM which is the line connecting the center positions between the recognized pair of the white lines LL and LR".

Further, the driving support ECU 10 calculates (i) a curve radius R and a curvature CL (=1/R) of the center line LM of the travel lane, and (ii) the position and the direction of the own vehicle 100 in the travel lane which is defined by the left white line LL and the right white line LR. Specifically, as illustrated in FIG. 4, the driving support ECU 10 calculates (i) a distance dL in the y-axis direction (substantially in the road-width direction) between the center position in the vehicle-width direction of the own vehicle 100 and the center line LM of the travel lane, and (ii) an angle of deviation θL (yaw angle θL) formed between the direction (tangential direction) of the center line LM and the traveling direction of the own vehicle 100. These parameters are the target lane information necessary for performing the LTC in the case where the center line LM of the travel lane is set as the target traveling line. The target lane information includes the curvature CL of the target traveling line, the yaw angle θL of the own vehicle with respect to the target traveling line, and the distance dL in the road-width direction with respect to the target traveling line.

In the Expression (4), the driving support ECU 10 replaces dv, θv, and Cv with dL, θL, and CL, respectively to thereby calculate the target steering angle θ*. The driving support ECU 10 controls the steering motor 42 by using the steering ECU 40 in such a manner that an actual steering angle θ of the own vehicle matches up with (becomes equal to) the target steering angle θ*. Alternatively, the driving support ECU 10 may control the steering motor 42 by using the Expression (4').

The above is the outline of the lane keeping assist control using the target traveling line determined based on the white lines.

Figure 5:
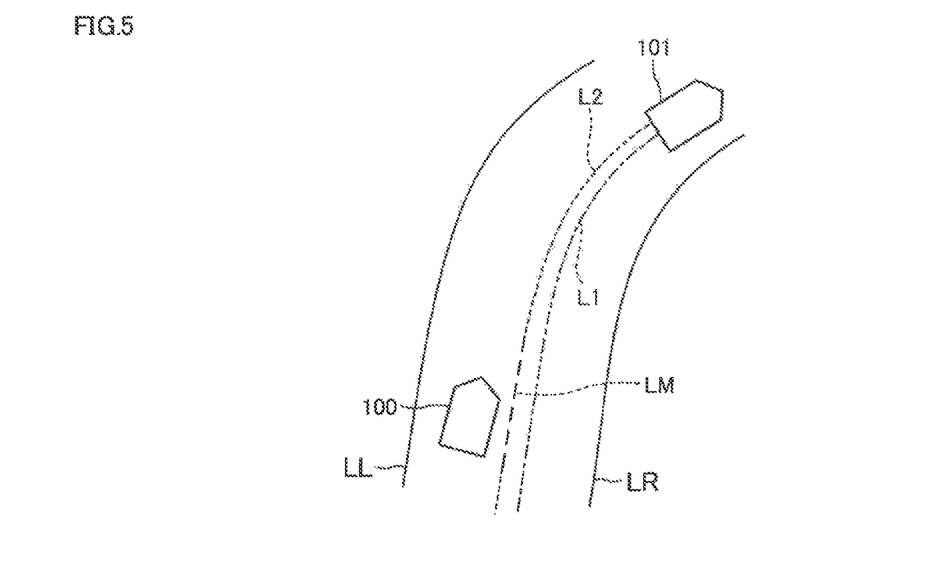
FIG. 5 is a diagram for illustrating a process for correcting/modifying the preceding vehicle trajectory based on the center line of the travel lane.

Further, the driving support ECU 10 may determine/extrapolate/obtain the target traveling line based on the combination of the preceding vehicle trajectory L1 and the center line LM of the travel lane. Specifically, as illustrated in FIG. 5, the driving support ECU 10 corrects/modifies the preceding vehicle trajectory L1 in such a manner that the preceding vehicle trajectory L1 becomes a trajectory which has the shape (curvature) of the preceding vehicle trajectory L1, and which matches up with the position and the direction (tangential direction) of the center line LM in the vicinity of the own vehicle 100. This allows the driving support ECU 10 to obtain, as the target traveling line, the preceding vehicle trajectory L2 which has the same shape (curvature) as the preceding vehicle trajectory L1 and has a small offset/deviation in the road-width direction with respect to the center line LM. Hereinafter, the preceding vehicle trajectory L2 which is obtained by correcting the preceding vehicle trajectory L1 in the above-mentioned manner is referred to as a "corrected preceding vehicle trajectory L2". The driving support ECU 10 acquires the target lane information regarding the corrected preceding vehicle trajectory L2 (that is, target traveling line) as described above, and performs the LTC.

In accordance with the following situations (a) to (d), the driving support ECU 10 sets the target traveling line depending on the presence/absence of the preceding vehicle and the recognition state of the white lines, to perform the LTC.

(a) When the driving support ECU 10 has successfully recognized the left and right white lines to relatively far distance (from the current position to a first predetermined distance), the driving support ECU 10 sets the target traveling line based on the center line LM of the travel lane to thereby perform the LTC.

(b) When the preceding vehicle is present in the traveling direction of the own vehicle (ahead of the own vehicle) and the driving support ECU cannot recognize any of the left and right white lines, the driving support ECU 10 sets the target traveling line based on the preceding vehicle trajectory L1 of that preceding vehicle to thereby perform the LTC.

(c) When the preceding vehicle is present in the traveling direction of the own vehicle (ahead of the own vehicle) and the driving support ECU has recognized the left and right white lines in the vicinity of the own vehicle (from the current position to a second predetermined distance shorter than the first predetermined distance), the driving support ECU 10 sets the target traveling line based on the corrected preceding vehicle trajectory L2 obtained by correcting the preceding vehicle trajectory L1 with the center line LM of the recognized white lines to thereby perform the LTC.

(d) When no preceding vehicle is present in the traveling direction of the own vehicle (ahead of the own vehicle) and the driving support ECU cannot recognize the left and right white lines, the driving support ECU 10 cancels the LTC.

As described above, the driving support ECU 10 has, as a functional unit implemented by the CPU, a "LTC control unit (lane keeping assist control unit) 10d for performing the lane keeping assist control for changing the steering angle of the own vehicle in such a manner that the own vehicle travels along the target traveling line".

<LTC for Interruption Vehicle>

Figure 6A:
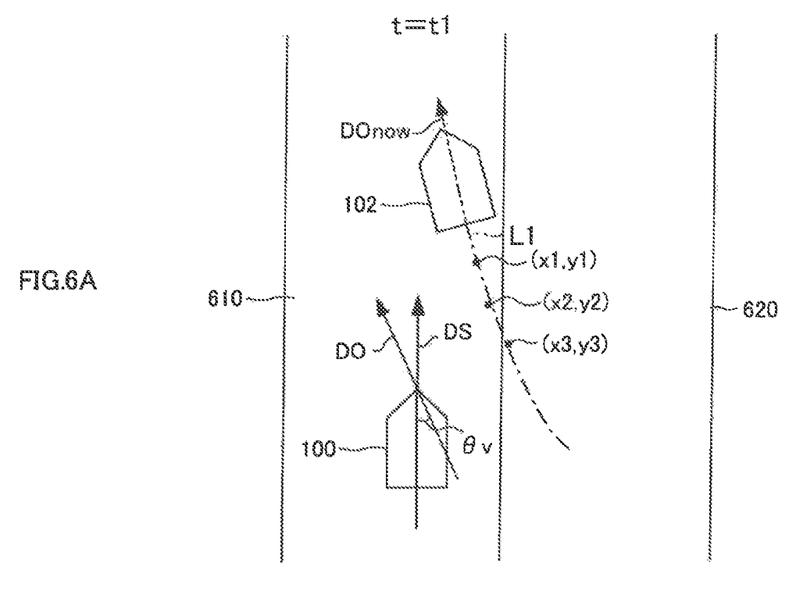
FIG. 6A is a plan view for illustrating a situation in which another vehicle (interrupting vehicle) is entering ahead of an own vehicle.
Figure 6B:
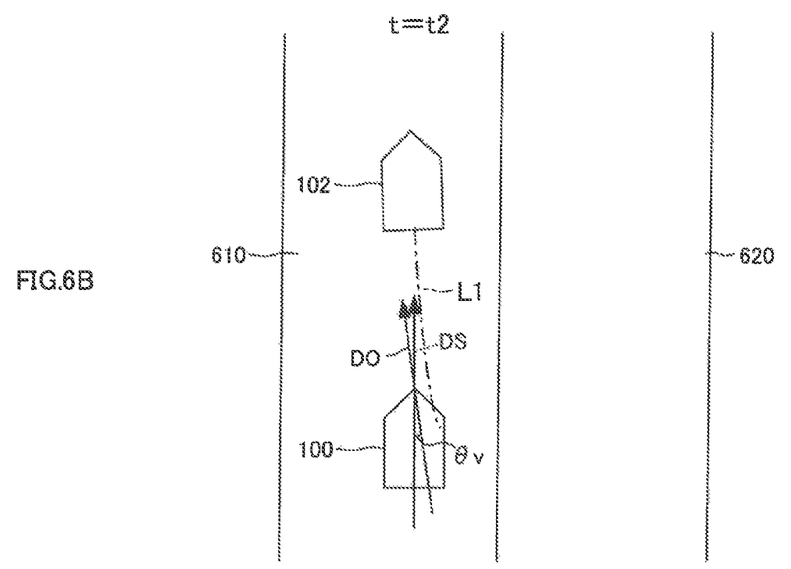
FIG. 6B is a plan view for illustrating a situation in which the interruption of the interrupting vehicle has been completed.

Next, with reference to FIG. 6, "the LTC which is performed by the driving support ECU 10 when an interrupting vehicle enters ahead of the own vehicle" will be described. In FIG. 6, a time at a certain calculation timing is expressed as t=t1, and a time at a calculation timing after a predetermined time period (time period longer than the above-mentioned sampling period) has elapsed from the timing t=t1 is expressed as t=t2.

First, a situation immediately before time t1 in FIG. 6A will be described. The driver operated the operation switch 17 to request the execution of the ACC and the LTC. At that time, there was no preceding vehicle positioned in the traveling direction of the own vehicle 100, and the camera sensor 16b could not recognize the left white line and the right white line. Therefore, immediately before time t1, the driving support ECU 10 could not obtain the preceding vehicle trajectory L1 and/or the center line LM of the travel lane, whereby the LTC was not performed. Further, at time t1, the own vehicle 100 travels in a first travel lane 610. Under such a situation, an interrupting vehicle 102 moves from a "second travel lane 620 adjacent to the first travel lane 610" toward the first travel lane 610 between the time immediately before time t1 and time t1. Then, the interrupting vehicle 102 enters ahead of (in front of) the own vehicle 100 at time t1.

Therefore, at time t1, the driving support ECU 10 specifies the interrupting vehicle 102 as a new preceding vehicle. The driving support ECU 10 stores the position coordinate data of the specified interrupting vehicle 102 in the RAM. At time t1, the driving support ECU 10 converts the position coordinate data of the interrupting vehicle 102 to acquire the converted position coordinate data. In FIG. 6A, (x1, y1), (x2, y2) and (x3, y3) are examples of the converted position coordinate data of the interrupting vehicle 102. The driving support ECU 10 executes the above-mentioned curve fitting process by using the converted position coordinate data of the interrupting vehicle 102 to obtain the preceding vehicle trajectory L1 of the interrupting vehicle 102. The driving support ECU 10 stores the obtained preceding vehicle trajectory L1 in the RAM.

The driving support ECU 10 calculates, as a first deviation angle θv, a magnitude of an angle formed between a direction DO of the preceding vehicle trajectory L1 and a traveling direction DS of the own vehicle 100 at the current position. Here, the direction DO of the preceding vehicle trajectory L1 is a tangential direction of the preceding vehicle trajectory L1, that is, a traveling direction of the interrupting vehicle 102. In the examples illustrated in FIG. 6A and FIG. 6B, the first deviation angle θv is the absolute value of the angle formed between the tangential direction DO of the preceding vehicle trajectory L1 at the current position (i.e., x=0) of the own vehicle 100 and the traveling direction DS of the own vehicle 100 at the current position. Alternatively, the first deviation angle θv may be the absolute value of an angle formed between "a tangential direction of the preceding vehicle trajectory L1 at an arbitrary x-coordinate between the current position (x=0) of the own vehicle 100 and the current position of the interrupting vehicle 102" and "the traveling direction DS of the own vehicle 100 at the current position". Therefore, for example, the first deviation angle θv may be the absolute value of an angle formed between "a tangential direction $DO_{now}$ of the preceding vehicle trajectory L1 at the current position of the interrupting vehicle 102" and "the traveling direction DS of the own vehicle 100 at the current position".

The driving support ECU 10 determines whether or not the first deviation angle θv is equal to or smaller than a first predetermined threshold Th1. As illustrated in FIG. 6A, when the first deviation angle θv is larger than the first predetermined threshold Th1, the driving support ECU 10 determines that the interrupting vehicle 102 is currently entering (cutting in) ahead of the own vehicle 100. In other words, the driving support ECU 10 determines that the interrupting vehicle 102 is in the process of the interruption action (interruption movement in the road-width direction), and therefore, the interrupting vehicle 102 has not yet completed that interruption action at the current time point. In this case, the driving support ECU 10 discards the obtained preceding vehicle trajectory L1 of the interrupting vehicle 102 (that is, removes the preceding vehicle trajectory L1 from the RAM). Therefore, when the driving support ECU 10 determines that the interrupting vehicle 102 is currently entering ahead of the own vehicle 100, the driving support ECU 10 does not start the LTC based on the preceding vehicle trajectory L1 of the interrupting vehicle 102.

Further, in this case, in order to prevent "a relatively-rapid traveling behavior in the road-width direction of the interrupting vehicle 102" from affecting (being reflected on) the preceding vehicle trajectory L1 on and after the next calculation timing of the preceding vehicle trajectory L1, the driving support ECU 10 may execute the following process. The driving support ECU 10 may remove from the RAM the position coordinate data of the interrupting vehicle 102 which was used for the calculation of the preceding vehicle trajectory L1 at time t1. The position coordinate data to be removed here are, for example, the position coordinate data which are the source of the converted position coordinates (x1, y1), (x2, y2) and (x3, y3). In this configuration, the driving support ECU 10 may remove from the RAM all the position coordinate data of the interrupting vehicle 102, or remove from the RAM the predetermined number of pieces of the position coordinate data from the oldest one.

Thereafter, every time the calculation timing of the preceding vehicle trajectory L1 arrives, the driving support ECU 10 repeatedly obtains the preceding vehicle trajectory L1 based on newly-obtained position coordinate data of the interrupting vehicle 102, and monitors/determines whether or not the first deviation angle θv is equal to or smaller than the first threshold Th1.

Therefore, as illustrated in FIG. 6B, when the interrupting vehicle 102 has substantially completed the interruption action (that is, interruption movement from the second travel lane 620 to the first travel lane 610) at time t2, the first deviation angle θv with respect to "the preceding vehicle trajectory L1 of the interrupting vehicle 102 obtained at time t2" becomes equal to or smaller than the first threshold Th1. At this time point, since the interruption action of the interrupting vehicle 102 has been substantially completed, the moving speed in the road-width direction of the interrupting vehicle 102 is small. In other words, at time t2, the interrupting vehicle 102 has terminated/completed the interruption action and thus, is traveling along the first travel lane 610. That is, the interrupting vehicle 102 is traveling in a direction substantially parallel to the direction of the center line of the first travel lane 610. Therefore, when the first deviation angle θv is equal to or smaller than the first threshold Th1, the driving support ECU 10 sets/uses/adopts the preceding vehicle trajectory L1 of the interrupting vehicle 102 as the target traveling line, and starts the LTC (steering control) based on the set target traveling line.

As described above, when the driving support ECU 10 determines that the interrupting vehicle 102 is entering ahead of the own vehicle 100, the driving support ECU 10 discards the preceding vehicle trajectory L1 of the interrupting vehicle 102 (and all or part of the position coordinate data of the interrupting vehicle 102 which was used for obtaining that preceding vehicle trajectory L1). Therefore, the driving support ECU 10 does not start the LTC based on the preceding vehicle trajectory L1 of the interrupting vehicle 102. Thereafter, when the first deviation angle θv becomes equal to or smaller than the first threshold Th1, the driving support ECU 10 determines that the interruption action of the interrupting vehicle 102 has been substantially completed. On and after that determination time point, the driving support ECU 10 performs the LTC based on the preceding vehicle trajectory L1 of the interrupting vehicle 102.

<Concrete Operation>

Figure 7:
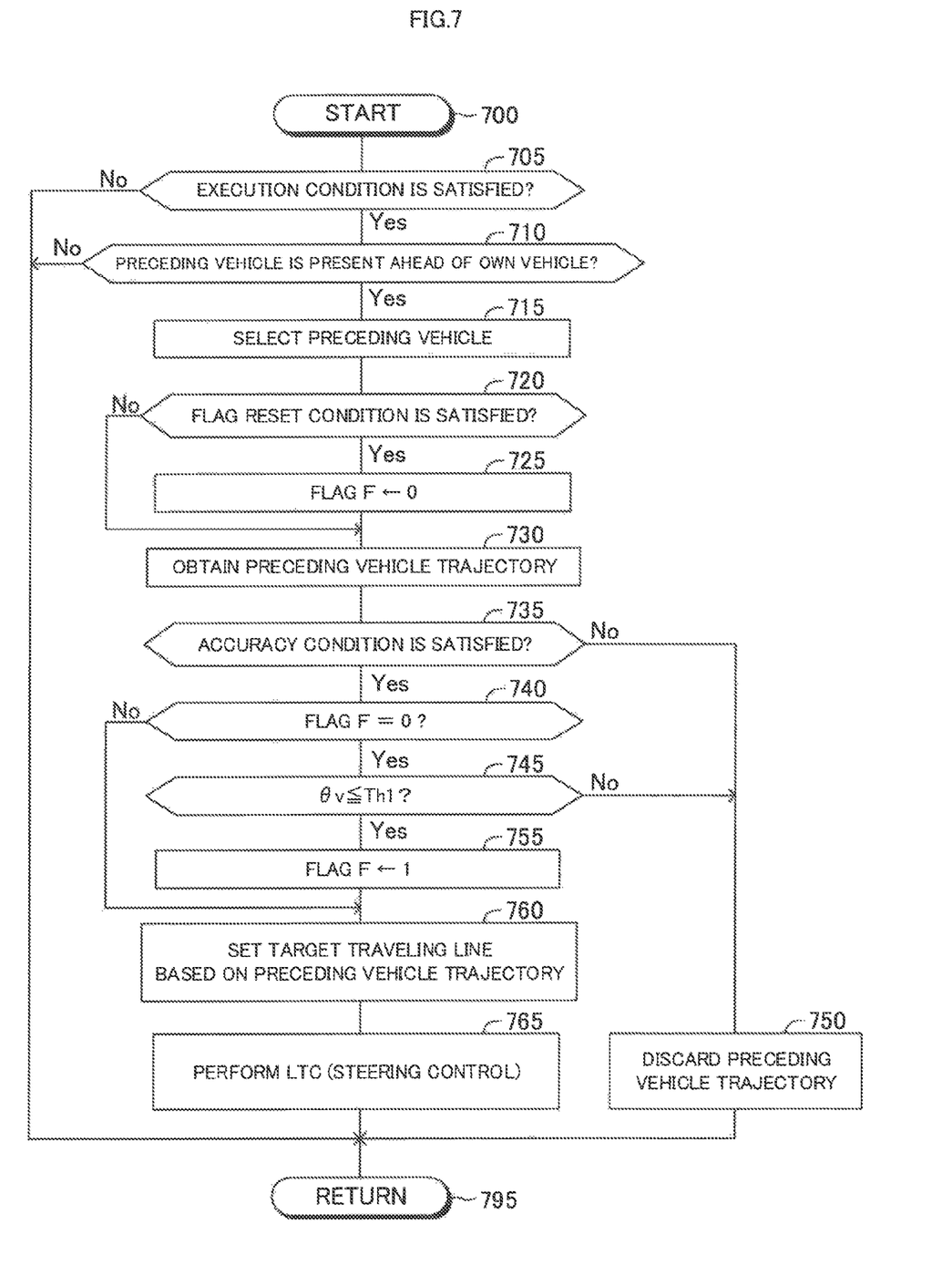
FIG. 7 is a flowchart for illustrating a routine executed by a driving support ECU according to the embodiment.

Next, a concrete operation of the CPU (hereinafter, simply referred to as the "CPU") of the driving support ECU 10 will be described. As one routine for performing the LTC, the CPU is configured or programmed to execute a routine of FIG. 7 shown by a flowchart every time a predetermined period of time elapses (every time a predetermined calculation timing arrives). In addition, the CPU executes the routine of FIG. 7 while the ACC is being performed.

Therefore, as the predetermined calculation timing arrives, the CPU starts from a process of Step 700 in FIG. 7, and proceeds to Step 705 to determine whether or not a predetermined execution condition is satisfied.

The predetermined execution condition is satisfied when the following conditions 1 and 2 are both satisfied.

(condition 1): The execution of the LTC is being selected through the operation of the operation switch 17.

(condition 2): Up to the current calculation timing, the camera sensor 16b has not recognized the left white line and the right white line for setting the center line LM of the travel lane. That is, the CPU is not performing the LTC based on the center line LM of the travel lane at the current time point.

When the predetermined execution condition is not satisfied, the CPU makes a "No" determination at Step 705, and then, proceeds directly to Step 795 to tentatively terminate the present routine. In this case, the LTC is not started.

On the other hand, when the predetermined execution condition is satisfied, the CPU makes a "Yes" determination at Step 705, and proceeds to Step 710. Then, the CPU determines whether or not a preceding vehicle is present ahead of the own vehicle 100.

Here, it is assumed that no preceding vehicle is present ahead of the own vehicle at the previous calculation timing of the present routine, and no interrupting vehicle is present which is about to enter (cut in) ahead of the own vehicle in a period from the previous calculation timing to the current calculation timing of the present routine. In this situation, since no preceding vehicle is present ahead of the own vehicle, the CPU makes a "No" determination at Step 710, and proceeds directly to Step 795 to tentatively terminate the present routine.

On the other hand, it is assumed that an interrupting vehicle is entering ahead of the own vehicle in a period from the previous calculation timing to the current calculation timing. In this situation, since the preceding vehicle (that is, the interrupting vehicle) is present ahead of the own vehicle at the current time point, the CPU makes a "Yes" determination at Step 710, and proceeds to Step 715. At Step 715, the CPU selects the preceding vehicle which is a target for obtaining the preceding vehicle trajectory L1. Hereinafter, the preceding vehicle which is the target for obtaining the preceding vehicle trajectory L1 is also referred to as a "trajectory-target vehicle".

Specifically, at Step 715, the CPU acquires the traveling speed SPD of the own vehicle 100 from the vehicle speed sensor 15, and the yaw rate of the own vehicle 100 from the yaw rate sensor 18. Further, the CPU extrapolates the traveling direction of the own vehicle 100 based on the "acquired traveling speed SPD and yaw rate". The CPU selects, as the trajectory-target vehicle, the nearest target object with respect to the own vehicle 100 in its traveling direction (i.e., the target object having the shortest distance away in the traveling direction of the own vehicle 100), based on the target object information transmitted from the ambient sensor 16.

Next, the CPU proceeds to Step 720 and determines whether or not a flag reset condition is satisfied. For example, the flag reset condition is satisfied when one of the following conditions 3 and 4 is satisfied.

(condition 3): Although the CPU did not select the trajectory-target vehicle at the previous calculation timing, the CPU selects newly the trajectory-target vehicle at the current calculation timing.

(condition 4): The trajectory-target vehicle selected at the current calculation timing is different from a vehicle selected as the trajectory-target vehicle at the previous calculation timing.

Now, the interrupting vehicle is entering ahead of the own vehicle in a period from the previous calculation timing to the current calculation timing. Therefore, the above-mentioned condition 3 is satisfied. Since the flag reset condition is satisfied, the CPU makes a "Yes" determination at Step 720, and proceeds to Step 725. The CPU sets the value of a flag F to zero at Step 725, and proceeds to Step 730.

As described above, the CPU stores the position coordinate data for each target object in the RAM in association with each target object, based on the target object information from the ambient sensor 16. At Step 730, the CPU acquires the position coordinate data corresponding to the trajectory-target vehicle selected at Step 715, among the pieces of the position coordinate data. The CPU calculates the converted position coordinate data based on the acquired position coordinate data. Further, the CPU executes the curve fitting process with respect to the converted position coordinate data to thereby obtain/calculate the preceding vehicle trajectory L1 of the trajectory-target vehicle.

Next, the CPU proceeds to Step 735, and determines whether or not a condition (hereinafter, referred to as an "accuracy condition") regarding the accuracy of the preceding vehicle trajectory L1 is satisfied. The accuracy condition is a condition for determining whether or not the accuracy of the preceding vehicle trajectory L1 of the trajectory-target vehicle obtained at Step 730 is high. For example, the accuracy condition is satisfied when the trajectory-target vehicle selected at Step 715 has been detected by a plurality of the sensors (that is, both of the radar sensor 16a and the camera sensor 16b). This is because, when the trajectory-target vehicle has been detected by a plurality of the sensors, it is considered that the accuracy of the position coordinate data of the trajectory-target vehicle is high. As will be described later, the accuracy condition is not limited to the above example.

Now, it is assumed that the accuracy condition is satisfied. In this situation, the CPU makes a "Yes" determination at Step 735, and proceeds to Step 740 to determine whether or not the value of the flag F is zero. Since the interrupting vehicle is entering ahead of the own vehicle at the current time point, the value of the flag F is set to "zero" at Step 725. Therefore, the CPU makes a "Yes" determination at Step 740, and proceeds to Step 745 to determine whether or not the first deviation angle θv is equal to or smaller than the first threshold Th1.

Now, since the interrupting vehicle is entering ahead of the own vehicle as described above, the first deviation angle θv is larger than the first threshold Th1 as explained with reference to FIG. 6A. Therefore, the CPU makes a "No" determination at Step 745, and proceeds to Step 750. At Step 750, the CPU discards the preceding vehicle trajectory L1 obtained at Step 730 (that is, removes the preceding vehicle trajectory L1 from the RAM). That is, the CPU does not start the LTC based on the target traveling line which is the preceding vehicle trajectory L1 of the trajectory-target vehicle selected at Step 715. Thereafter, the CPU proceeds to Step 795 to tentatively terminate the present routine.

In this situation, when the predetermined period of time elapses, the CPU resumes the process from Step 700. When the CPU proceeds to Step 705, the above-mentioned predetermined execution condition (all of the conditions 1 and 2) is again satisfied. Therefore, the CPU proceeds from Step 705 to Step 710. Further, the interrupting vehicle is present in this situation, and therefore, the preceding vehicle is present ahead of the own vehicle. Thus, the CPU proceeds from Step 710 to Step 715, and selects again the interrupting vehicle as the trajectory-target vehicle. Thereafter, the CPU proceeds to Step 720.

In this case, the trajectory-target vehicle has been selected at the previous calculation timing, and the trajectory-target vehicle selected at the current calculation timing is the same vehicle as the vehicle selected as the trajectory-target vehicle at the previous calculation timing. Therefore, neither of the above-mentioned condition 3 nor condition 4 is satisfied. That is, the flag reset condition is not satisfied. Thus, the CPU makes a "No" determination at Step 720 and proceeds directly to Step 730. As a result, the value of the flag F is maintained at "zero".

The CPU again obtains/calculates the preceding vehicle trajectory L1 of the trajectory-target vehicle at Step 730, and then, determines whether or not the accuracy condition is satisfied at Step 735.

If the accuracy condition is satisfied, the CPU proceeds to Step 740. Further, since the flag F is maintained at zero at the current time point, the CPU proceeds to Step 745. It is assumed that the interrupting vehicle selected as the trajectory-target vehicle still continues the interruption action at the current time point. In this case, the first deviation angle θv is still larger than the first threshold Th1. Therefore, the CPU proceeds from Step 745 to Step 750. At Step 750, the CPU discards the preceding vehicle trajectory L1 obtained at step 730, and therefore, the CPU does not start the LTC based on the preceding vehicle trajectory L1 used as the target traveling line.

While the above-mentioned processes are repeated, the interrupting vehicle has substantially completed the interruption action. In this case, the first deviation angle θv becomes equal to or smaller than the first threshold Th1. Thus, when the CPU proceeds to Step 745, the CPU makes a "Yes" determination, and proceeds to Step 755 to set the value of the flag F to "1".

Next, the CPU proceeds to Step 760 to set the preceding vehicle trajectory L1 obtained at Step 730 as the target traveling line. That is, the trajectory of the interrupting vehicle selected as the trajectory-target vehicle at Step 715 is set as the target traveling line. Then, the CPU proceeds to Step 765, and performs the LTC (steering control) based on the target traveling line set by using the preceding vehicle trajectory L1 of the interrupting vehicle. Thereafter, the CPU proceeds to Step 795 to tentatively terminate the present routine.

After the predetermined period of time elapses in this situation, the CPU resumes the process from Step 700. When the CPU proceeds to Step 705, the above-mentioned predetermined execution condition (all of the conditions 1 and 2) is again satisfied. Therefore, the CPU proceeds from Step 705 to Step 710. Further, in this situation, the preceding vehicle (interrupting vehicle) is present ahead of the own vehicle. Therefore, the CPU proceeds from Step 710 to Step 715. The CPU again selects the interrupting vehicle as the trajectory-target vehicle, and proceeds to Step 720.

In this situation, the trajectory-target vehicle has been selected at the previous calculation timing, and the trajectory-target vehicle selected at the current calculation timing is the same vehicle as the vehicle selected as the trajectory-target vehicle at the previous calculation timing. Therefore, neither of the above-mentioned condition 3 nor condition 4 is satisfied. That is, the flag reset condition is not satisfied. Thus, the CPU makes a "No" determination at Step 720, and proceeds directly to Step 730. As a result, the value of the flag F is maintained at "1".

The CPU again obtains/calculates the preceding vehicle trajectory L1 of the trajectory-target vehicle at Step 730, and proceeds to Step 735 to determine whether or not the accuracy condition is satisfied.

If the accuracy condition is satisfied, the CPU proceeds to Step 740. In this case, since the value of the flag F is maintained at "1", the CPU makes a "No" determination at Step 740, and proceeds directly to Step 760. Thereafter, the CPU proceeds to Step 765. As a result, the CPU continues performing the LTC based on the target traveling line which is the preceding vehicle trajectory L1 of the trajectory-target vehicle being the same as the vehicle (interrupting vehicle) selected as the trajectory-target vehicle at the previous calculation timing.

In addition, at the time point at which the CPU executes the process of Step 735, when the accuracy condition is not satisfied, the CPU makes a "No" determination at Step 735, and proceeds to Step 750. Therefore, the LTC is not performed based on the preceding vehicle trajectory L1 of which the accuracy condition is not satisfied.

In this manner described above, when the interrupting vehicle 102 enters ahead of the own vehicle 100, the embodiment apparatus discards the preceding vehicle trajectory L1 of the interrupting vehicle 102 without performing the LTC based on the preceding vehicle trajectory L1 of the interrupting vehicle 102, while the first deviation angle θv is larger than the first threshold Th1. Therefore, while the interrupting vehicle 102 is entering ahead of the own vehicle 100, the LTC is not performed based on the preceding vehicle trajectory L1 which is influenced by the behavior of the interrupting vehicle 102. Accordingly, the own vehicle 100 can be made to travel stably along the travel lane without suddenly moving in the road-width direction. Meanwhile, on and after the first deviation angle θv becomes equal to or smaller than the first threshold Th1, that is, on and after the interrupting vehicle 102 has substantially completed the interruption action (interruption movement in the road-width direction), the embodiment apparatus performs the LTC based on the preceding vehicle trajectory L1 of the interrupting vehicle 102. The preceding vehicle trajectory L1 of the interrupting vehicle 102 and the position coordinate data which are the source of that preceding vehicle trajectory L1 have been discarded until the completion of the interruption movement of the interrupting vehicle 102. Therefore, the "relatively-rapid traveling behavior in the road-width direction of the interrupting vehicle 102" is not reflected on (does not impose an influence on, affects) the preceding vehicle trajectory L1. Accordingly, the own vehicle 100 can be made to travel along the travel lane stably.

The present disclosure is not limited to the above-mentioned embodiment, and various changes can be adopted within the scope of the present disclosure.

<Modification 1>

The routine as illustrated in FIG. 7 can be applied to a case where the interrupting vehicle 102 enters between a preceding vehicle (first preceding vehicle) and the own vehicle 100, in the above-mentioned situation (b) (that is, the LTC has already been performed based on the preceding vehicle trajectory L1 of the first preceding vehicle until a time point at which the interrupting vehicle 102 enters ahead of the own vehicle 100).

In this case, the execution condition at Step 705 may be replaced with a condition which is satisfied when all of the following condition 1, condition 2, and condition 3A described below are satisfied.

(condition 1): The execution of the LTC has been selected through the operation of the operation switch 17.

(condition 2): Up to the current calculation timing, the camera sensor 16b has not recognized the left white line and the right white line for setting the center line LM of the travel lane. That is, the CPU is not performing the LTC based on the center line LM of the travel lane at the current time point.

(condition 3A): A preceding vehicle (the "first preceding vehicle") is present ahead of the own vehicle at the previous calculation timing, and the CPU is performing the LTC based on the preceding vehicle trajectory of the first preceding vehicle at the current time point.

Further, when the CPU according to the present modification proceeds to Step 750, the CPU discards the preceding vehicle trajectory L1 of the interrupting vehicle 102 obtained at Step 730, and does not perform the LTC based on the preceding vehicle trajectory L1 of the interrupting vehicle 102. In addition, at Step 750, the CPU continues performing the LTC based on the preceding vehicle trajectory L1 of the first preceding vehicle.

On the other hand, when the CPU makes a "Yes" determination at Step 745 and proceeds to Step 765 through Steps 755 and 760, the CPU performs the LTC based on the preceding vehicle trajectory L1 of the interrupting vehicle 102. According to the present modification, even if the interrupting vehicle 102 enters ahead of the own vehicle 100 in the above-mentioned situation (b), the own vehicle 100 can be made to travel stably along the travel lane without suddenly moving in the road-width direction.

<Modification 2>

The routine as illustrated in FIG. 7 can be also applied to a case where the interrupting vehicle 102 enters between a preceding vehicle (second preceding vehicle) and the own vehicle 100, in the above-mentioned situation (c) (that is, the LTC is being performed based on the target traveling line which is the corrected preceding vehicle trajectory L2 of the second preceding vehicle).

In this case, the execution condition at Step 705 may be replaced with a condition which is satisfied when all of the following condition 1, condition 2B, and condition 3B described below are satisfied.

(condition 1): The execution of the LTC has been selected through the operation of the operation switch 17.

(condition 2B): Up to the current calculation timing, the camera sensor 16b has recognize the left white line and/or the right white line only in the vicinity of the own vehicle.

(condition 3B): A preceding vehicle (the "second preceding vehicle") is present ahead of the own vehicle at the previous calculation timing, and the CPU is performing the LTC based on the corrected preceding vehicle trajectory L2' obtained by correcting the preceding vehicle trajectory L1' of the second preceding vehicle with the recognized white line(s).

When the CPU according to the present modification proceeds to Step 750, the CPU discards the preceding vehicle trajectory L1 of the interrupting vehicle 102 obtained at Step 730, and does not perform the LTC based on the corrected preceding vehicle trajectory L2 which is obtained by correcting the preceding vehicle trajectory L1 of the interrupting vehicle 102 with the white line(s). In addition, at Step 750, the CPU continues performing the LTC based on the corrected preceding vehicle trajectory L2' obtained by correcting the preceding vehicle trajectory L1' of the second preceding vehicle with the recognized white line(s).

On the other hand, when the CPU makes a "Yes" determination at Step 745 and proceeds to Step 765 through Steps 755 and 760, the CPU performs the LTC based on the corrected preceding vehicle trajectory L2 which is obtained by correcting the preceding vehicle trajectory L1 of the interrupting vehicle 102 with the white line(s). According to the present modification, even if the interrupting vehicle 102 enters ahead of the own vehicle 100 in the above-mentioned situation (c), the own vehicle 100 can be made to travel stably along the travel lane without suddenly moving in the road-width direction.

<Modification 3>

At Step 745, the CPU may replace "the traveling direction of the own vehicle used for the calculation of the first deviation angle θv" with "the tangential direction of the center line LM at the current position of the own vehicle". In this configuration, it is required that the center line LM has been extrapolated/recognized based on the recognized white lines. The driving support ECU 10 according to the present modification can more effectively determine whether or not the interrupting vehicle has substantially completed entering ahead of the own vehicle 100.

<Modification 4>

In place of or in addition to the accuracy condition used at Step 735, the following accuracy condition 1 and/or accuracy condition 2 may be used.

(accuracy condition 1): The length of the preceding vehicle trajectory L1 (that is, the distance between the latest position coordinate of the trajectory-target vehicle and the oldest position coordinate of the trajectory-target vehicle) is equal to or longer than a predetermined length threshold.

(accuracy condition 2): The inter-vehicle distance between the trajectory-target vehicle and the own vehicle is equal to or longer than a predetermined first distance, and is shorter than a predetermined second distance.

Regarding the accuracy condition 1, as the length of the preceding vehicle trajectory L1 is longer, the amount of the stored position information (coordinate values) of the preceding vehicle is larger. Therefore, it is considered that the accuracy of the preceding vehicle trajectory L1 obtained through the curve fitting process is high.

Regarding the accuracy condition 2, when the inter-vehicle distance between the own vehicle and the trajectory-target vehicle is extremely long or extremely short, the accuracy of the position coordinate data of the trajectory-target vehicle becomes lower (the error of the position information becomes larger). Therefore, when the inter-vehicle distance is within the above-mentioned predetermined range, it is considered that the accuracy of the preceding vehicle trajectory L1 obtained through the curve fitting process is high.

<Modification 5>

The above embodiment apparatus is configured to perform the LTC only while the ACC is being performed. However, an apparatus according to the present modification may be configured to perform the LTC even if the ACC is not being performed.

What is claimed is:

1. A driving support apparatus for an own vehicle comprising:
   an electronic control unit (ECU) including at least one processor programmed to:
   obtain a traveling trajectory of an other vehicle which travels ahead of the own vehicle; and
   perform a lane keeping assist control for changing a steering angle of the own vehicle in such a manner that the own vehicle travels along a target traveling line set based on the traveling trajectory,
   wherein, when a specific state occurs in which an interrupting vehicle is entering ahead of the own vehicle in (i) a situation in which no preceding vehicle is present ahead of the own vehicle, or (ii) a situation in which a preceding vehicle is present ahead of the own vehicle, obtain the traveling trajectory of the interrupting vehicle, and
   wherein:
   when the specific state occurs, only on and after a deviation angle formed between a direction of the traveling trajectory of the interrupting vehicle and a traveling direction of the own vehicle becomes equal to or smaller than a predetermined threshold, perform the lane keeping assist control based on the traveling trajectory of the interrupting vehicle.

2. The driving support apparatus according to claim 1, wherein:
   when the specific state occurs in a situation in which a preceding vehicle is present ahead of the own vehicle and the lane keeping assist control is being performed based on the traveling trajectory of the preceding vehicle, continue performing the lane keeping assist control based on the traveling trajectory of the preceding vehicle while the deviation angle is larger than the predetermined threshold, and
   on and after the deviation angle becomes equal to or smaller than the predetermined threshold, perform the lane keeping assist control based on the traveling trajectory of the interrupting vehicle.

3. The driving support apparatus according to claim 1, wherein:
   when the specific state occurs, as long as the deviation angle formed between a direction of the traveling trajectory of the interrupting vehicle and a traveling direction of the own vehicle is larger than a predetermined threshold, the traveling trajectory of the interrupting vehicle is discarded, and the lane keeping assist control is based on the traveling trajectory of the preceding vehicle instead of the interrupting vehicle.

4. A method of performing lane keeping assist control for an own vehicle using an electronic control unit (ECU) including at least one processor, comprising:
   obtaining a traveling trajectory of an other vehicle which travels ahead of the own vehicle; and
   performing a lane keeping assist control for changing a steering angle of the own vehicle in such a manner that the own vehicle travels along a target traveling line set based on the traveling trajectory,
   wherein, when a specific state occurs in which an interrupting vehicle is entering ahead of the own vehicle in (i) a situation in which no preceding vehicle is present ahead of the own vehicle, or (ii) a situation in which a preceding vehicle is present ahead of the own vehicle, obtaining the traveling trajectory of the interrupting vehicle, and
   wherein, when the specific state occurs, only on and after a deviation angle formed between a direction of the traveling trajectory of the interrupting vehicle and a traveling direction of the own vehicle becomes equal to or smaller than a predetermined threshold, performing the lane keeping assist control based on the traveling trajectory of the interrupting vehicle.

* * * * *